United States Patent
Chin et al.

(10) Patent No.: US 9,084,126 B2
(45) Date of Patent: Jul. 14, 2015

(54) METHODS AND APPARATUS FOR DETERMINING A LOCATION OF A MOBILE STATION

(71) Applicant: QUALCOMM Incorporated, San Diego, CA (US)

(72) Inventors: Tom Chin, San Diego, CA (US); Qingxin Chen, Del Mar, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 254 days.

(21) Appl. No.: 13/754,330

(22) Filed: Jan. 30, 2013

(65) Prior Publication Data

US 2014/0213282 A1    Jul. 31, 2014

(51) Int. Cl.
| | |
|---|---|
| *H04W 24/00* | (2009.01) |
| *H04W 64/00* | (2009.01) |
| *G01S 5/02* | (2010.01) |
| *G01S 19/06* | (2010.01) |
| *H04W 4/02* | (2009.01) |

(52) U.S. Cl.
CPC ............... *H04W 24/00* (2013.01); *G01S 5/02* (2013.01); *G01S 5/0205* (2013.01); *H04W 64/00* (2013.01); *G01S 19/06* (2013.01); *H04W 4/025* (2013.01); *Y02B 60/50* (2013.01)

(58) Field of Classification Search
CPC ..... H04W 24/00; H04W 64/00; H04W 4/025; G01S 19/06

USPC .............. 455/456.1, 435.1, 434, 432.2, 432.1
See application file for complete search history.

(56) References Cited

U.S. PATENT DOCUMENTS

| | | | |
|---|---|---|---|
| 6,433,735 B1 * | 8/2002 | Bloebaum et al. ........ | 342/357.43 |
| 2008/0031203 A1 * | 2/2008 | Bill .............................. | 370/338 |
| 2008/0227465 A1 * | 9/2008 | Wachter et al. ............ | 455/456.1 |
| 2010/0039315 A1 | 2/2010 | Malkos et al. | |
| 2010/0120394 A1 | 5/2010 | Mia et al. | |
| 2010/0156706 A1 * | 6/2010 | Farmer et al. .............. | 342/357.1 |
| 2011/0026506 A1 | 2/2011 | MacNaughtan et al. | |
| 2011/0038320 A1 | 2/2011 | Chun et al. | |
| 2013/0288717 A1 * | 10/2013 | Choi .......................... | 455/456.3 |

FOREIGN PATENT DOCUMENTS

WO    2011087516 A1    7/2011

* cited by examiner

*Primary Examiner* — Barry Taylor
(74) *Attorney, Agent, or Firm* — Kilpatrick Townsend & Stockton LLP

(57) ABSTRACT

Methods and apparatuses are presented for determining a location of a mobile station. In some embodiments, a mobile station may acquire at least one attribute of a reference base station to obtain the identity of the reference base station. A first and a second locally unique attribute of a local base station may then be acquired. The mobile station may then compute a distance metric from the mobile station to the reference base station based on the at least one attribute, and the first and second locally unique attributes. The location of the mobile station may be determined based at least in part on the distance metric. In some embodiments, the distance metric may include a number of how many base stations away (i.e. "hops" or number of handovers) the mobile station is from the reference base station.

28 Claims, 9 Drawing Sheets

500

502

| Information Element/Group name | Need | Multi | Type and Reference | Semantics description |
|---|---|---|---|---|
| Cell identity | MP | | bit string(28) | |

504

| Information Element/Group name | Need | Multi | Type and Reference | Semantics description |
|---|---|---|---|---|
| Cell parameter Id | MP | | Integer (0..127) | |

506

| Information Element/Group name | Need | Multi | Type and Reference | Semantics description |
|---|---|---|---|---|
| Primary Frequency | MP | | Integer (0..16383) | [22] |

FIG. 5A

METHODS AND APPARATUS FOR DETERMINING A LOCATION OF A MOBILE STATION

BACKGROUND

Wireless communications systems traditionally rely on satellites within a line of sight in order to obtain a positioning and timing information. Increasingly, wireless communications systems may rely on terrestrial base stations in order to assist in acquiring information about the location of satellites or other timing information. However, in some wireless communications systems, acquiring the locations or identities of the terrestrial base stations may be difficult or time consuming in certain circumstances. In some cases, limitations of mobile devices utilizing the wireless communications, and even limitations in the properties of the wireless communications systems themselves, may prevent or hinder effective acquisition and identification of base stations. It may be desirable to create techniques or systems that improve on any or all of these characteristics.

SUMMARY

These problems and others may be solved according to embodiments of the present invention, described herein.

In some embodiments, a mobile station may identify a local base station whose global identity is unknown based on how far away the local base station is from a reference base station whose global identity is known (e.g. the CID is known). In some embodiments two other pieces of data may be utilized: a locally unique base station identification, sometimes called a midamble index, and a cell frequency parameter. The mobile station may obtain local identification of the local base station based on the midamble index and frequency, and by determining how many base stations away (i.e. "hops," or in other words the number of handovers from one base station to the next) or what distance away is the local base station from the reference base station.

In some embodiments, a mobile station may acquire at least one attribute of a reference base station such that the identity of the reference base station is known to the mobile station. The mobile station may acquire a first locally unique attribute of a local base station and a second locally unique attribute of a local base station. The mobile station may then compute a distance metric from the mobile station to the reference base station, based on the at least one attribute of the reference base station, the first locally unique attribute and the second locally unique attribute of the local base station. The location of the mobile station may be determined based at least in part on the distance metric.

In some embodiments, the at least one attribute of the reference base station includes a first globally unique attribute, and the identity of the reference base station may be known to the mobile station based on the first globally unique attribute of the reference base station.

In some embodiments, the at least one attribute of the reference base station may further include a third locally unique attribute and a fourth locally unique attribute each of the reference base station. Also, computing the distance metric may be based on the first locally unique attribute and the second locally unique attribute of the local base station, and the third locally unique attribute and the fourth locally unique attribute of the reference base station.

In some embodiments, the first globally unique attribute may include a Cell ID of the reference base station. In some embodiments, the first locally unique attribute may include a midamble index of the local base station, the second locally unique attribute may include a frequency parameter of the local base station, the third locally unique attribute may include a midamble index of the reference base station, and the fourth locally unique attribute may include a frequency parameter of the reference base station.

In some embodiments, computing the distance metric from the mobile station to the reference base station is performed in response to a determination that a second globally unique attribute of a local base station is not available.

In some embodiments, the mobile station may also determine that the third locally unique attribute and the fourth locally unique attribute of the local base station conveys conflicting information. The mobile station may also acquire the second globally unique attribute of the local base station in response to determining the conflicting information. In some embodiments, the mobile station may determine the local base station to be a threshold distance too far away from the reference base station, based on the distance metric. The mobile station may then acquire the second globally unique attribute of the local base station if it is determined that the distance between the local base station and the reference base station exceeds the threshold distance. In some embodiments, the distance metric may include a number of hops away from the mobile station to the reference base station. In some embodiments, the methods described herein may operate in a TD-SCDMA or a UMTS-FDD messaging standards environment.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A shows exemplary message formats according to some embodiments.

DETAILED DESCRIPTION

Figure 1:
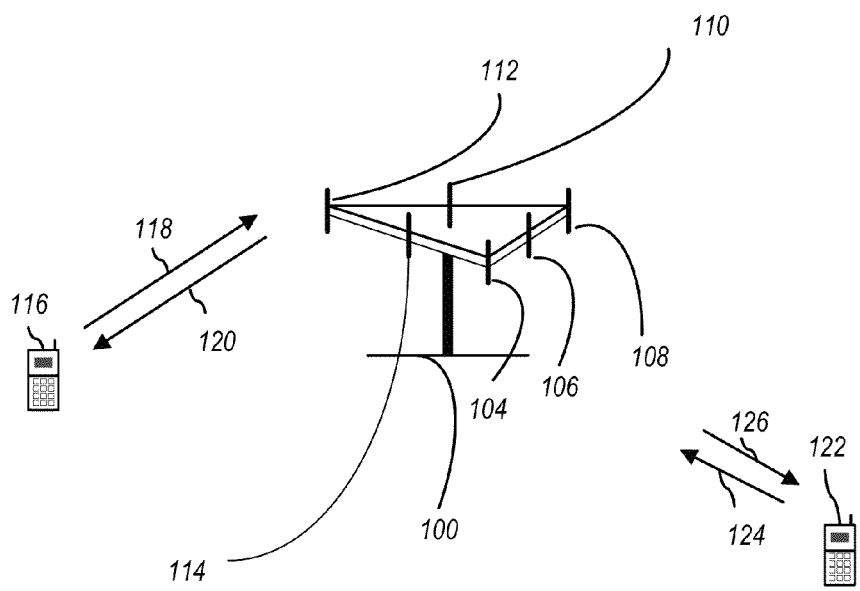
FIG. 1 is an example multiple access wireless communication system according to some embodiments.

The word "exemplary" is used herein to mean "serving as an example, instance, or illustration." Any embodiment or design described herein as "exemplary" is not necessarily to be construed as preferred or advantageous over other embodiments or designs.

The term "globally unique attribute" may refer to an attribute, value, identifier or marker that is unique globally, in the sense that reference to a globally unique attribute unambiguously refers to only one entity in the entire world. Examples of globally unique attributes may include IP addresses for devices configured to access the Internet, Vehicle Identification Numbers (VINs) for vehicles, international telephone numbers and cell Identity (CID) values for terrestrial base stations.

The term "locally unique attribute" may refer to an attribute, value, identifier or marker that is unique locally, in the sense that there may be duplicates of the same locally unique attribute and thus reference to a locally unique attribute may identify only a local entity without ambiguity. Examples of a locally unique attribute may include street addresses, student ID numbers, city names, cell parameter IDs (CPIDs), midamble indices and primary frequency values of terrestrial base stations.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Time Division Synchronous Code Division Multiple Access (TD-SCDMA), Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An FDMA network may include Universal Mobile Telecommunications System-frequency-division duplexing (UMTS-FDD) and the like. An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

In some embodiments, a mobile station may determine local base stations nearby by relying on locally-unique attributes of the base stations instead of globally-unique attributes of the base stations. During high traffic volume, a mobile station may be unable to receive globally-unique attributes of a local base station, preventing the mobile station from identifying the local base station under conventional means. An exhaustive search for any base stations may then need to be performed under conventional means, but the signal acquisition time may be improved over performing an exhaustive search, by relying on locally-unique attributes of nearby base stations when globally-unique attributes have not been obtained. In some embodiments, the identity of a local base station may be determined based on computing a distance metric from a known reference base station with known globally-unique attributes to the local base station with only known locally-unique attributes. In some embodiments, a location of the mobile station may be determined using these same techniques.

In some embodiments, a mobile station may identify a local base station whose global identity is unknown based on how far away the local base station is from a reference base station whose global identity is known (e.g. the CID is known). In some embodiments two other pieces of data may be utilized: a locally unique base station identification, sometimes called a midamble index, and a cell frequency parameter. The mobile station may obtain local identification of the local base station based on the midamble index and frequency, and by determining how many base stations away (i.e. "hops," or in other words the number of handovers from one base station to the next) or what distance away is the local base station from the reference base station. This general technique may be especially useful in air interfaces such as TD-SCDMA and UMTS-FDD, standards which may not require a CID to be transmitted to the mobile station during handover messaging. Further details will be described in the following figures and corresponding descriptions, below.

Acquiring the identity of local base stations may be important for various reasons. For example, a mobile station may rely on local base stations for global positioning and timing information in the event that satellites are not sufficiently in view with the mobile station. As another example, local base stations may be used in cell phone communications. Acquiring the identity of local base stations quickly and efficiently may help a mobile station maintain continuous reception, so as to prevent dropped calls, for example. Additionally, achieving these ends in an efficient manner may reduce power consumption as well as save time. Embodiments described herein may help achieve any and all of these benefits.

Referring to FIG. 1, a multiple access wireless communication system according to some embodiments is illustrated. An access point (AP) 100 includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with AP 100 via antennas 112 and 114, where antennas 112 and 114 transmit signals to access terminal 116 over forward link 120 and receive signals from access terminal 116 over reverse link 118. Access terminal 122 is in communication with AP 100 via antennas 106 and 108, where antennas 106 and 108 transmit signals to access terminal 122 over forward link 126 and receive signals from access terminal 122 over reverse link 124. In a Frequency Division Duplex (FDD) system, communication links 118, 120, 124 and 126 may use different frequencies for communication. For example, forward link 120 may use a different frequency then that used by reverse link 118.

Each group of antennas and/or the area in which they are designed to communicate is often referred to as a sector of the access point. In some embodiments, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
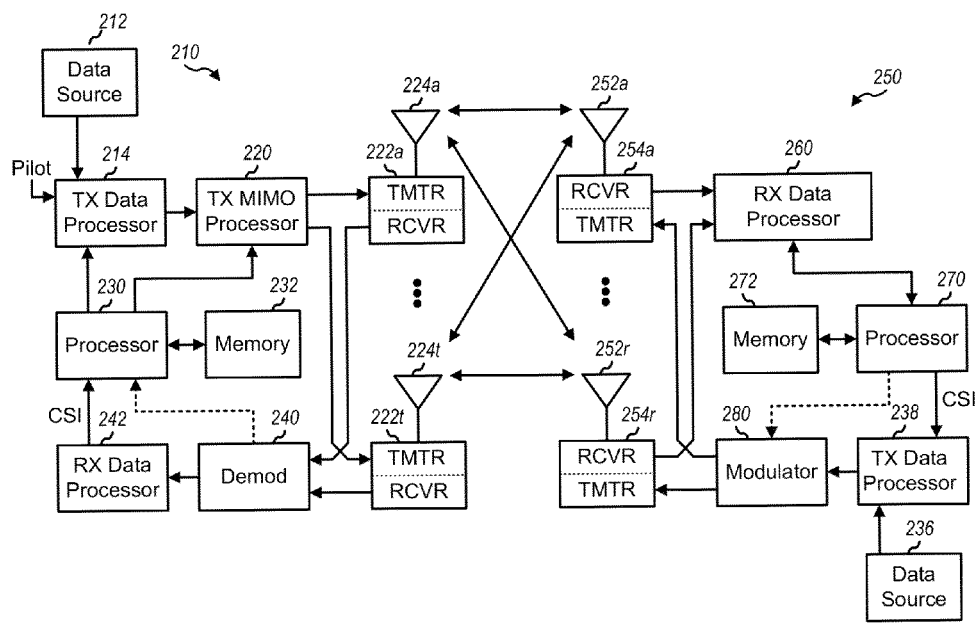
FIG. 2 is an example wireless communications interface including a transmitter system and a receiver system according to some embodiments.

FIG. 2 is a block diagram of an embodiment of a transmitter system 210 of an access point and a receiver system 250 of an access terminal in a multiple-input and multiple-output (MIMO) system 200. It should be noted however, that while an example MIMO system 200 is described, MIMO is not used in some embodiments, as other systems may be used (e.g. SISO, MISO, SIMO, etc.) apparent to persons having ordinary skill in the art. At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t, where NT is a positive integer associated with transmitters described in FIG. 2. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r, where NR is a positive integer associated with receivers described in FIG. 2. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. Memory 272 stores the various pre-coding matrices that are used by processor 270. Memory 272 may also contain other types of data, such as information databases and locally and globally unique attributes of multiple base stations.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message. Processor 230 obtains the pre-coding matrices from memory 232, which stores various pre-coding matrices.

Figure 3:
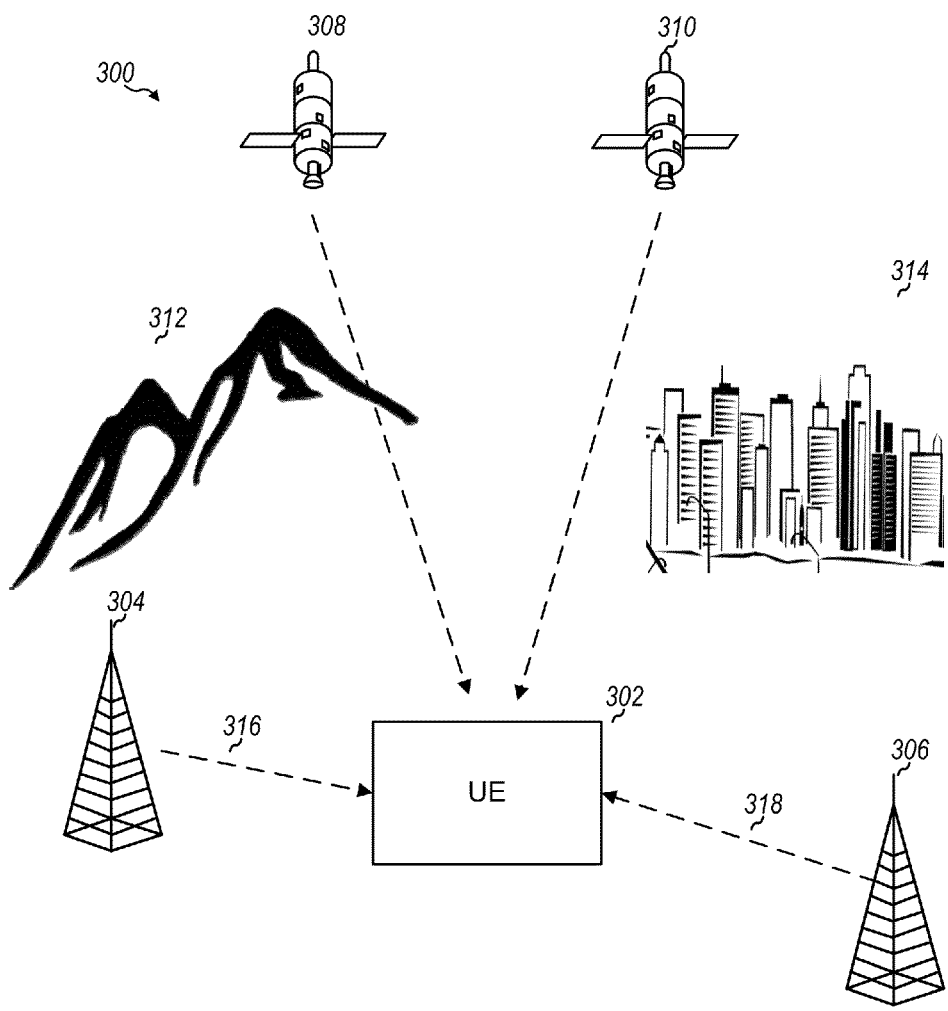
FIG. 3 is an example wireless communications environment of a user equipment (UE) according to some embodiments.

Referring to FIG. 3, in some embodiments, a user equipment (UE) 302 may operate within a wireless network environment 300. A UE 302 may refer to any apparatus used and/or operated by a user or consumer, such as a mobile device, cell phone, electronic tablet, touch screen device, radio, GPS device, etc. A UE or mobile station (e.g. a cell phone) 302 may attempt to determine its global position or access global positioning information for other purposes, utilizing satellites 308 and/or 310 to do so. The mobile station 302 may also rely on receiving data from nearby terrestrial base stations 304 and/or 306, not just satellites 308 and/or 310, particularly when the mobile station 302 has limited visibility to the sky and satellites 308 and/or 310 due to mountain ranges 312, tall buildings, 314, crowded areas, etc.

To improve the time needed to acquire position information from local base stations 304 or 306—and thus improve the time delay in determining the mobile station's 302 global position—the mobile station 302 may store in memory a globally unique identification number of each base station that the mobile station may typically use, e.g. base stations 304 and 306. This globally unique identification number may be referred to as the cell ID (CID) of a base station. Each base station in the world has a unique CID, thereby allowing a mobile station 302 to identify exactly which base station is being accessed just by knowing the CID. Remembering the CIDs of often-used base stations, e.g. 304 and 306, allows the mobile station 302 to easily acquire signals of those base stations 304 and 306, reducing the time spent exhaustively searching for base station signals. Base stations may typically transmit their CID automatically, as part of system information broadcasted so that any UE 302 within range has an opportunity to receive the information. In this case, UE 302 may receive the globally unique CID of base station 304 via wireless signal 316, and UE 302 may receive the globally unique CID of base station 306 via wireless signal 318.

Figure 4:
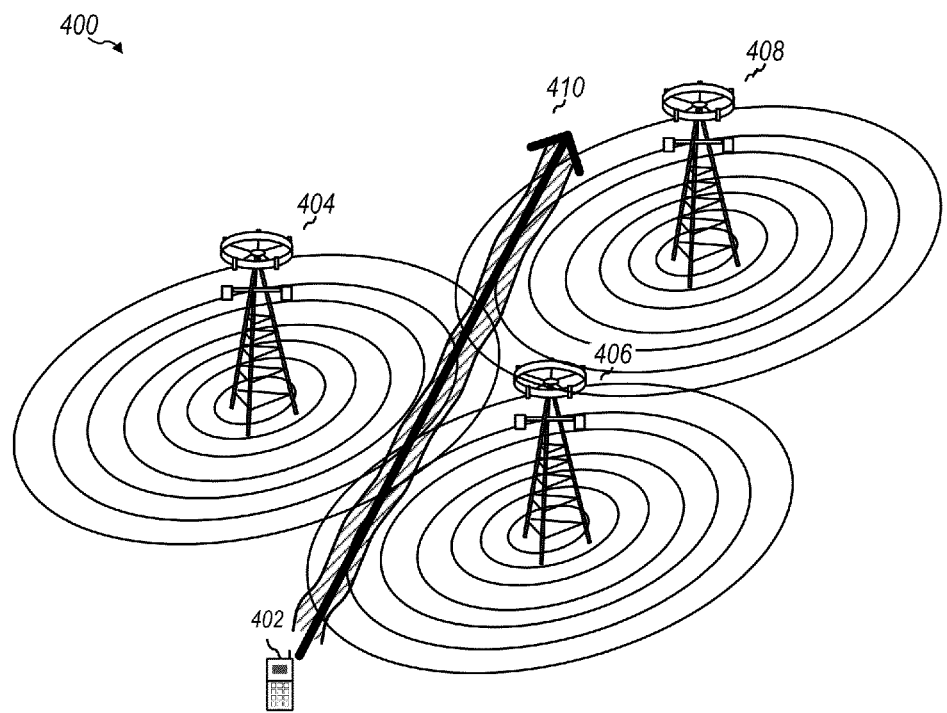
FIG. 4 is an example scenario of a mobile station traveling through the ranges of multiple base stations according to some embodiments.

However, referring to FIG. 4, some wireless communications environments (e.g. air interfaces, e.g. TD-SCDMA, UMTS-FDD, LTE, CDMA, etc.), which govern the types and format of data capable of being sent between mobile stations and base stations, do not require the CID to be transmitted to the mobile station in certain circumstances, such as when the mobile station experiences high traffic volume. This may be a problem particularly when a mobile station passes beyond the range of one base station into the range of another (e.g. handover situations) and thus needs to identify the next base station.

For example, in wireless environment 400, a mobile station 402 may travel through the ranges of various base stations 404, 406, and 408. The mobile station 402 may be travelling in a car or a train or through some other means. The rings around base stations 404, 406, and 408 indicate how far the base stations may be able to provide reception of their respective transmissions. The arrow 410 may indicate the path that mobile station 402 may travel, perhaps on a road or on train tracks or the like. As mobile station 402 travels along the path 410, it can be seen that mobile station 402 will pass through the range first of base station 406, fall out of range of base station 406 and into the range of base station 404. Then mobile station 402 will travel out of the range of base station 404 and into the range of base station 408.

The mobile station 402 may automatically seek access of another base station as it loses reception of a current base station. This process of switching from one base station to the next, e.g. the switching of base stations described above, may be referred to as "handovers." During handovers, the mobile station 402 may acquire information allowing it to determine a globally unique identification number of a local base station currently in range, such as the CID. However, in certain circumstances, e.g. high traffic volume situations, some wireless communications environments, such as TD-SCDMA and UMTS-FDD, may not require the CID to be received by the mobile device. Thus, the CID of a new base station may not be identified during handover situations, e.g. when traveling along path 410, when mobile station 402 is used in a high traffic volume situation. If the CID is not identified due to heavy traffic or for other reasons, then the mobile station 402 cannot rely on the CID to identify the next base station and, according to conventional means, must instead perform an exhaustive search to find the next base station, causing significant time delay and loss in energy resources. It may be desirable then to have an alternate method for quickly acquiring base stations when a mobile station 402 crosses between base station boundaries.

Referring to FIG. 5A, according to some embodiments however, a mobile station may receive two other pieces of data, e.g. a first locally unique base station identification sometimes called a midamble index or cell parameter ID (CPID) and a second locally unique base station identification sometimes called a cell frequency parameter or primary frequency (PF), in order to determine what base stations are near to the mobile station when the mobile station does not receive the globally unique CID from the nearby base station. This general technique may be especially useful in air interfaces such as TD-SCDMA and UMTS-FDD, standards which may not require a CID to be transmitted to the mobile station during traffic.

Diagram 500 may illustrate example message formats and descriptions of a globally unique attribute 502, e.g. a Cell Identity or CID, a first locally unique attribute 504, e.g. a midamble index or cell parameter ID (CPID), and a second locally unique attribute 506, e.g. a primary frequency (PF) of a base station. The CID may be considered a globally unique attribute because each base station in the world is labeled with a unique CID, such that any particular CID unambiguously refers to only one base station in the world. A CPID and a PF each may be considered locally unique attributes of a base station because the values of a CPID and PF may repeat for other base stations, such that values of a CPID and PF may only help identify base stations in a local area.

Exemplary CID format 502 may show some attributes of a CID, and by extension a globally unique attribute according to some embodiments. Here, the format of a CID may be a bit string of 28 characters. In some embodiments, a character may be any number or letter. In other embodiments, a character may be a hexadecimal value. The format may be globally unique in that no CID value is the same, and thus a match of a CID may signal an identification of that particular base station belonging to that particular CID.

Exemplary CPID format 504 may show a format for a locally unique attribute having integer values ranging only from 0 to 127. It may be known, therefore, that base stations having a particular CPID value may have overlapping matches to other base stations, since there are many more than just 128 base stations installed around the world.

Exemplary PF format 506 may show a format for another locally unique attribute having integer values ranging from 0 to 16383. Here, given that there is a greater range of values than exemplary format 504, the combination of the both values, as a first locally unique attribute and a second locally unique attribute, may help to more definitively determine a base station even without receiving the globally unique attribute.

Figures 5B, 5C:
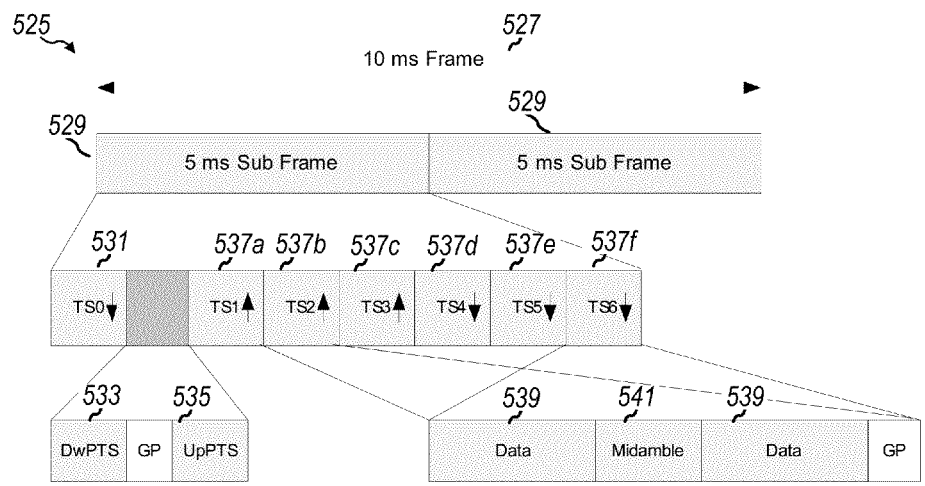
FIG. 5B shows other exemplary message formats according to some embodiments.
FIG. 5C is an example database of some embodiments.

Referring to FIG. 5B, exemplary message format 525 may illustrate where in a data stream the global and local unique attributes may be found. A signal received by a mobile device in an air interface may be divided into 10 millisecond (ms) frames 527. Within each frame 527, there may be two 5 ms sub-frames 529. Within each subframe, there may be 7 time slots (TSs), each TS containing a specific set of information organized in a particular pattern, with an $8^{th}$ time slot used to contain information organized in a completely different pattern. Here, TS0 531 may contain downlink information, as signified by the arrow pointing down. Downlink information may be information received by a mobile station that is transmitted from a base station. TS0 531 may contain a globally unique attribute, such as a CID, and a locally unique attribute, such as a PF, in some embodiments. The next time slot may not be consistent with similar patterns of the other time slots, and may contain a downlink pilot slot (DwPTS) 533, a gap (GP), and an uplink pilot slot (UpPTS) 535. Uplink may refer to information transmitted by the mobile station that is received at a base station. The next six time slots 537*a* through 537*f* may contain either downlink (DL) information or uplink (UL) information. In this example, three TSs 537*a*, 537*b*, and 537*c*, are designated for UL, and three TSs 537*d*, 537*e*, and 537*f*, are designated for DL. Each of these TSs may be subdivided according to the same message format as shown. For example, the TS may contain a data payload portion 539, followed by a midamble value 541, followed by another data portion 539, and then a gap. In some embodiments, the midamble may have a duration of 144 chips in time and may be used for coherence demodulation, synchronization, power measurement and/or channel estimation. In some embodiments, a TS may repeat the aforementioned format 16 times. This format may repeat for each of the TSs 537*a* through 537*f*. This format may be called a channelization code in some embodiments. The midamble 541 may be a locally unique attribute of the base station transmitting such information. The descriptions of FIG. 5B may be consistent with at least some air interfaces known in the art, such as TD-SCDMA. In other embodiments, other message formats may be used according to other air interfaces known in the art, and embodiments are not so limited.

Referring to FIG. 5C, chart 550 may illustrate how the midamble may be associated with the identity of a local base station as recorded in a mobile station. In some embodiments, there may be 128 different codes available as values for the midamble. The identity of a local base station may be recorded in a mobile station as a cell value, which in this case, ranges from 0 to 31. The cell values 0 to 31 may be associated as a group of 4 out of the 128 codes of the midamble, as shown. Thus, the midamble index therefore may be associated with one of the cell values 0 to 31, that is associated with one of the base stations recorded in the mobile station. In addition, in some embodiments, the frequency of a current cell may be taken into account, in conjunction with the midamble index, to determine the identity of the base station currently in range of the mobile station.

In some embodiments, the values of the midamble index and cell frequency may be referenced back to a known reference base station, whose global unique cell ID is known. The mobile station may determine a compute a distance metric in order to determine how far away the current base station is from the reference base station. The distance metric may be used to determine the location of the mobile station. In some embodiments, the distance metric may be a number of "hops," or number of base stations, from the local base station to the reference base station. In some embodiments, the distance metric may be an actual distance, expressed in any known units of distance. In some embodiments, distance may be estimated by an approximated speed the UE is traveling, multiplied by the time elapsed. In some embodiments, a maximum distance according to the distance metric may be determined based on multiplying the approximated speed with the time elapsed, as if the UE has moved in a nearly straight line. In some embodiments, additional pieces of information may be used to determine if the UE has changed direction and/or has traveled backwards, thereby refining the distance metric calculation. For example, a database recording information about local base stations may be stored in the UE and referenced to see if the UE has revisited recorded local base stations during its travels. If so, it may be reasoned that the UE has not traveled in a straight line, and the distance metric may be adjusted accordingly.

In some embodiments, since the midamble index may contain a fixed number of cell values, e.g. 32 different values, the number of base stations kept track of by the mobile station may be limited. Thus, if a mobile station travels too far away from the base stations currently recorded, a new reference base station may need to be obtained in any case. In addition, a database, containing the midamble indices and other information correlating locally unique attributes of base stations to globally unique attributes of base stations, may need to be purged and/or updated with new values from time to time.

Figure 6A:
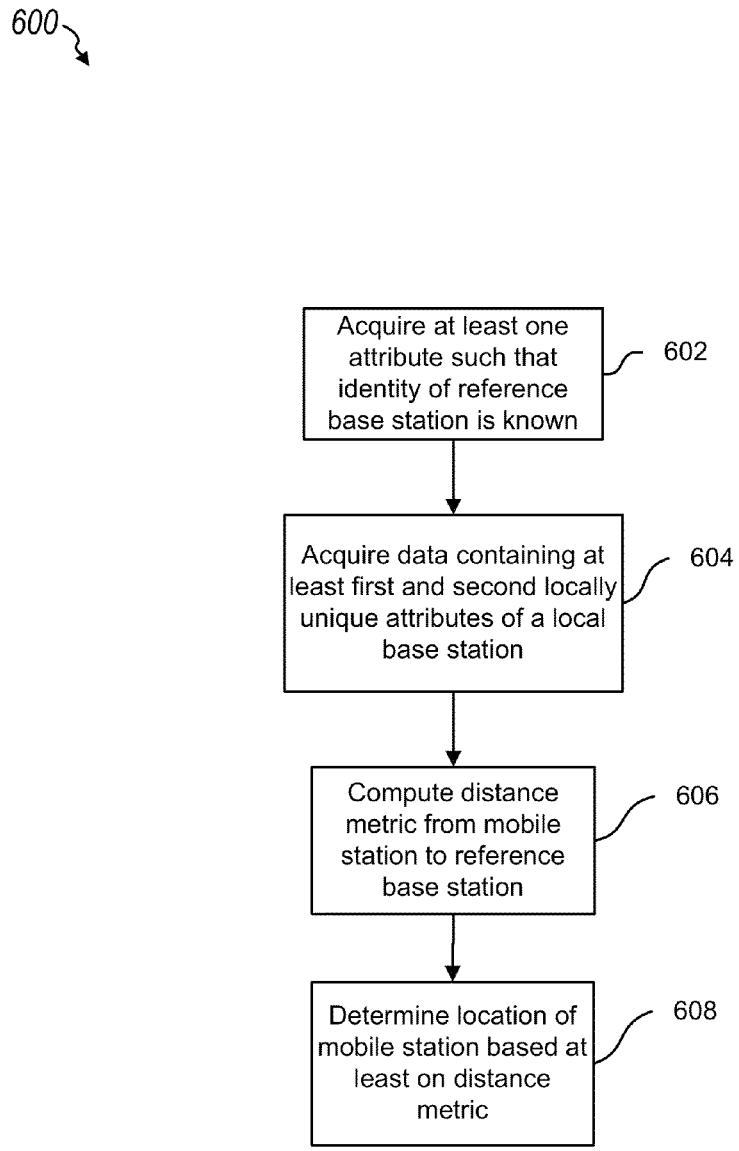
FIG. 6A is an exemplary flowchart showing methods of some embodiments.

Referring to FIG. 6A, flowchart 600 represents an exemplary methodology according to some embodiments. Starting at block 602, a mobile station may acquire at least one attribute of a reference base station such that the identity of the reference base station is unambiguously known to the mobile station. In some embodiments, the at least one attribute of the reference base station may include a globally unique attribute of the reference base station. An example of a globally unique attribute may be the cell ID of the reference base station. In some embodiments, the globally unique attribute may be used to unambiguously determine the identity of the reference base station. In some embodiments, the at least one attribute may also include locally unique attributes of the reference base station. Examples of locally unique attributes may include a midamble index of the reference base station and a frequency parameter of the reference base station. Examples of globally unique attributes and locally unique attributes may be consistent with exemplary descriptions throughout these disclosures, including descriptions related to FIGS. 3, 4, 5A, 5B, and 5C.

At block 604, a mobile station may acquire data containing at least a first and second locally unique attribute of a local base station. The local base station may be a nearby or the nearest base station to the mobile station. In some embodiments, the first locally unique attribute may be a midamble index of the local base station, and the second locally unique attribute may be a frequency parameter of the local base station. In some embodiments, the mobile station may acquire other types of data, including a globally unique attribute of the local base station. In other cases, this data may not be available.

At block 606, the mobile station may compute a distance metric from the mobile station to the reference base station. In some embodiments, the distance metric may include a number of hops from the reference base station to the local base station that the mobile station is nearest to. In some embodiments, determining the number of hops may include comparing the locally unique attributes of the local base station with the locally unique attributes associated with the reference base station. In other embodiments, determining the distance metric may involve computing an actual distance from the reference base station to the local base station based on the locally unique attributes of the reference and local base stations. Example methods for computing the distance metric may be consistent with descriptions throughout the present disclosure.

At block 608, a location of the mobile station may then be determined based at least in part on the distance metric computed in block 606. In some embodiments, the distance metric may be used to provide an approximate distance away from the reference base station. In some embodiments, the distance metric may be combined with other data to determine the location of the mobile station.

Figure 6B:
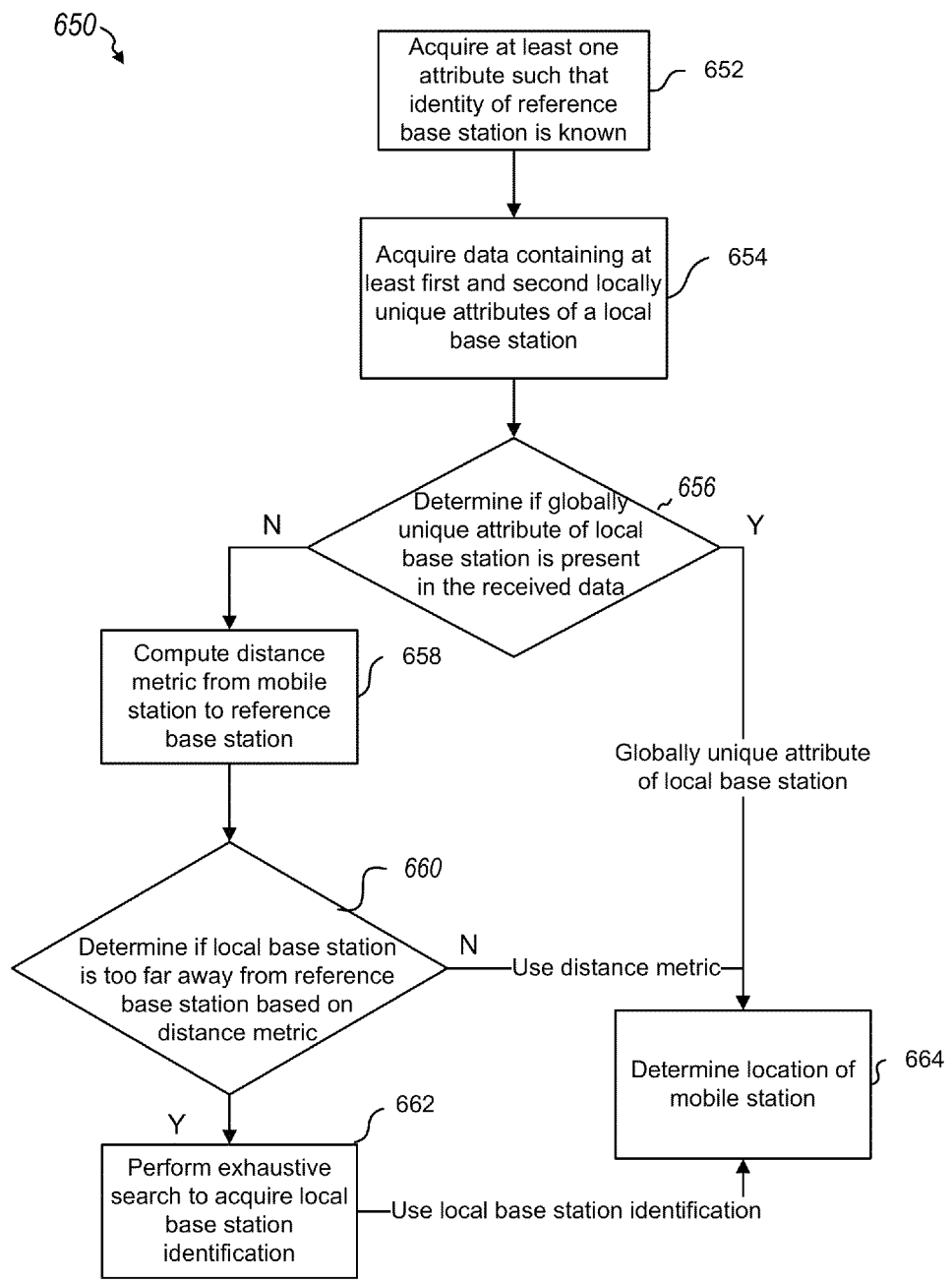
FIG. 6B is another exemplary flowchart showing methods of some embodiments.

Referring to FIG. 6B, flowchart 650 represents another exemplary methodology according to some embodiments. Starting at block 652, a mobile station may acquire at least one attribute of a reference base station such that the identity of the reference base station is unambiguously known to the mobile station. In some embodiments, the at least one attribute of the reference base station may include a globally unique attribute of the reference base station. An example of a globally unique attribute may be the cell ID of the reference base station. In some embodiments, the globally unique attribute may be used to unambiguously determine the identity of the reference base station. In some embodiments, the at least one attribute may also include locally unique attributes of the reference base station. Examples of locally unique attributes may include a midamble index of the reference base station and a frequency parameter of the reference base station. Examples of globally unique attributes and locally unique attributes may be consistent with exemplary descriptions throughout these disclosures, including descriptions related to FIGS. 3, 4, 5A, 5B, and 5C. As described, block 652 may be similar to steps performed in block 602, although it is noted that block 652 leads to additional steps not described in FIG. 6A.

At block 654, a mobile station may acquire data containing at least a first and second locally unique attribute of a local base station. The local base station may be a nearby or the nearest base station to the mobile station. In some embodiments, the first locally unique attribute may be a midamble index of the local base station, and the second locally unique attribute may be a frequency parameter of the local base station. In some embodiments, the mobile station may acquire other types of data, including a globally unique attribute of the local base station. In other cases, this data may not be available.

At block 656, it may be determined if a globally unique attribute of the local base station is present in the received data from block 654. As previously mentioned, in some cases a globally unique value may not be present in the received data because embodiments may be operating in a state that does not receive the globally unique values in some circumstances. For example, the globally unique value may not be received at a mobile station while in an SC-TDMA or UMTS-FDD environment when the mobile device is in a high traffic volume state, e.g. placing a call. In some embodiments, it may be determined whether the CID of a local base station is present in the received data.

Determining whether a globally unique attribute is present in the received data may be beneficial in cases where a mobile station needs to or desires to obtain the identity of a local base station or to determine the location of the mobile station. This may be useful in a variety of cases, one example being when a mobile station needs to switch reception from one local base station to another in a handover situation. Such handovers may be consistent with the scenario described in FIG. 4.

At block 664, if it is determined that the globally unique attribute of a local base station is present in the received data, then the mobile station may be able to estimate the location of the mobile station. As shown in FIG. 6B, three different techniques may be used to determine the location of the mobile station, depending on the circumstances of the mobile device. If block 664 is reached directly from block 656, then the mobile station may estimate its location using the globally unique attribute of the local base station. The mobile station may do this by determining the identity and location of the local base station, of which the mobile station knows it is nearby. For example, if it is determined that the CID of a local base station is present in the received data, the local base station may be identified using the CID. This may be possible because a CID value is associated with only one base station in the entire world, and thus the base station may be accurately identified after knowing the CID value. Then, the location of the mobile station may be determined shortly thereafter. The other paths to block 664 are discussed further below.

At block 658, if it is determined at block 656 that a globally unique attribute is not present in the received data, then the mobile station may compute a distance metric from the mobile station to the reference base station. In some embodiments, the distance metric may include a number of hops from the reference base station to the local base station that the mobile station is nearest to. In some embodiments, determining the number of hops may include comparing the locally unique attributes of the local base station with the locally unique attributes associated with the reference base station. In other embodiments, determining the distance metric may involve computing an actual distance from the reference base station to the local base station based on the locally unique attributes of the reference and local base stations. Example methods for computing the distance metric may be consistent with descriptions throughout the present disclosure.

At block 660, the mobile station may determine if the local base station is too far away from the reference base station to determine a location of the mobile station, based on the distance metric. The determination may be based on a threshold distance, and embodiments are not limited by the choice of threshold distance. In some embodiments, the threshold distance may be a number of base station hops away from the reference base station. In other embodiments, the threshold distance may be some actual predetermined distance.

In some embodiments, a database storing information associated with local base stations may be recorded and used to refine the distance metric. For example, a database may record a time-stamped series of information related to base stations, as the mobile station travels along and around other base stations. Starting from a record of when the mobile station was last in range of the reference base station, the number of base stations recorded subsequent to the last time the reference base station was visited may be used to determine the number of hops away from the reference base station. Thus, in some embodiments, a database may be used to facilitate a determination of the distance metric. Additionally, in some embodiments, it may be determined that some of the local base stations traveled, according to the records in the database, may be duplicates. This determination may be made based on the locally unique attributes, such as observing duplicate midamble index and parameter frequency. Thus, it may be inferred that the mobile station has circled back to a previously visited local base station, thereby reducing the distance metric (e.g. number of hops away, or total distance from the reference base station) and increasing accuracy.

If it is determined that the mobile station is not too far away, i.e. the distance metric is within or below the threshold distance, then the mobile device may use the distance metric in combination with the location of the reference base station to estimate the location of the mobile station, leading back to block 664. In some embodiments, the mobile station may be able to determine a range of locations from the reference base station, using the distance metric.

At block 662, if it is determined that the mobile station is too far away from the reference base station, based on the distance metric, then the mobile station may need to perform an exhaustive search to acquire identification of the local base station. In this case, the local base station may become a new or second reference base station, wherein the globally unique attributes of the local base station (now a new or second reference base station) may be acquired. In other words, the distance metric may be determined to not be usable anymore, based on how far the mobile station has traveled. Thus, a new reference base station may need to be acquired.

In this case, after acquiring the globally unique attributes of the local base station, the mobile station may be able to determine its location using the global knowledge about the local base station, leading back to block 664.

In some embodiments, the distance metric may also be used to determine or at least estimate what base stations may be in view of the mobile station. Since the distance metric is some form of ranging distance from the reference base station, the mobile station can apply such knowledge to determine what base stations around the reference station may be of use to the mobile station. This information may be useful for handover messaging, particularly when the mobile station is unable to unambiguously acquire the identity of the nearest local base station.

In some embodiments, since the midamble index and frequency values are only locally unique, the midamble index and frequency values stored in the database of the mobile station may need to be refreshed or updated periodically. Also, the CID, and thus a new reference base station, may need to be obtained again in some cases, such as when the locally unique attributes (i.e. midamble index, frequency) create errors or confusion, or when the mobile device has traveled too far away from the prior reference base station. In some cases, errors or confusion might occur because locally unique attributes can be reused. For example, if the UE is too far from a reference base station, the locally unique attributes may not be guaranteed to be unique anymore which can cause error. For example, a non-reference cell #1 related to reference base station #1 can have the same local unique attributes to non-reference cell #2 related to reference base station #2.

Many embodiments may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 7:
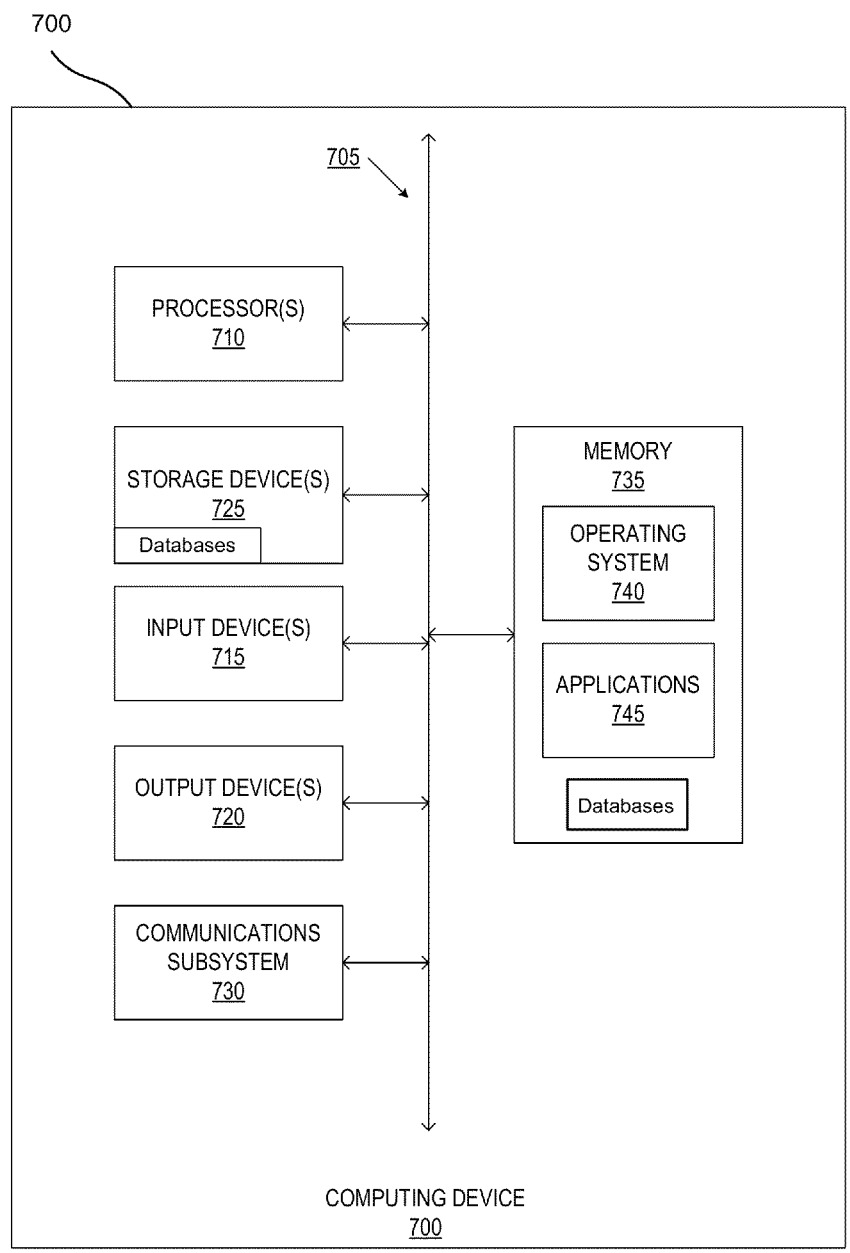
FIG. 7 is an example computer system according to some embodiments.

Having described multiple aspects of improving signal acquisition time of a base station, an example of a computing system in which various aspects of the disclosure may be implemented will now be described with respect to FIG. 7. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the system 700 is configured to implement any of the methods described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, wireless receivers, wireless sensors, a mouse, a keyboard and/or the like; and one or more output devices 720, which can include without limitation a display unit, a printer and/or the like. In some embodiments, the one or more processor 710 may be configured to perform a subset or all of the functions described above with respect to FIGS. 6A and 6B. The processor 710 may comprise a general processor and/or and application processor, for example. In some embodiments, the processor is integrated into an element that processes visual tracking device inputs and wireless sensor inputs.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 6A or 6B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example methods described with respect to FIG. 6A or 6B.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710. Memory 735 may contain at least one database according to any of the databases and methods described herein. Memory 735 may thus store any of the values discussed in any of the present disclosures, including FIGS. 5C, 6A, 6B and related descriptions.

The methods described in FIGS. 6A and 6B may be implemented by various blocks in FIG. 7. For example, processor 710 may be configured to perform any of the functions of blocks in diagrams 600 or 650. Storage device 725 may be configured to store an intermediate result, such as a globally unique attribute or locally unique attribute discussed within any of blocks mentioned herein. Storage device 725 may also contain a database consistent with any of the present disclosures. The memory 735 may similarly be configured to record signals, representation of signals, or database values necessary to perform any of the functions described in any of the blocks mentioned herein. Results that may need to be stored in a temporary or volatile memory, such as RAM, may also be included in memory 735, and may include any intermediate result similar to what may be stored in storage device 725. Input device 715 may be configured to receive wireless signals from satellites and/or base stations according to the present disclosures described herein. Output device 720 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for determining a location of a mobile station, the method comprising:
    acquiring at least one attribute of a reference base station such that the identity of the reference base station is known to the mobile station;
    acquiring a first locally unique attribute of a local base station and a second locally unique attribute of the local base station;
    computing a distance metric from the mobile station to the reference base station, based on the at least one attribute of the reference base station, the first locally unique attribute and the second locally unique attribute of the local base station; and
    determining the location of the mobile station based at least in part on the distance metric;
    wherein the at least one attribute of the reference base station includes a first globally unique attribute, the identity of the reference base station known to the mobile station based on the first globally unique attribute of the reference base station, and a third locally unique attribute and a fourth locally unique attribute each of the reference base station, and wherein computing the distance metric is based on the first locally unique attribute and the second locally unique attribute of the local base station, and the third locally unique attribute and the fourth locally unique attribute of the reference base station.

2. The method of claim 1, wherein:
    the first globally unique attribute comprises a Cell ID of the reference base station.

3. The method of claim 1, wherein:
    the first locally unique attribute comprises a midamble index of the local base station, the second locally unique attribute comprises a frequency parameter of the local base station, the third locally unique attribute comprises a midamble index of the reference base station, and the fourth locally unique attribute comprises a frequency parameter of the reference base station.

4. The method of claim 1, wherein computing the distance metric from the mobile station to the reference base station is performed in response to a determination that a second globally unique attribute of a local base station is not available.

5. The method of claim 1, further comprising:
    determining that the third locally unique attribute and the fourth locally unique attribute of the local base station conveys conflicting information; and
    acquiring the second globally unique attribute of the local base station in response to determining the conflicting information.

6. The method of claim 1, further comprising:
    determining whether a distance between the local base station and the reference base station exceeds a threshold distance from the reference base station; and
    acquiring the second globally unique attribute of the local base station if it is determined that the distance between the local base station and the reference base station exceeds the threshold distance.

7. The method of claim 1, wherein the distance metric comprises a number of hops away from the mobile station to the reference base station.

8. The method of claim 1, wherein the mobile station operates in a TD-SCDMA or a UMTS-FDD messaging standards environment.

9. A mobile station comprising:
    a receiver configured to:
        acquire at least one attribute of a reference base station such that the identity of the reference base station is known to the mobile station; and
        acquire a first locally unique attribute of a local base station and a second locally unique attribute of a local base station; and
    a processor configured to:
        compute a distance metric from the mobile station to the reference base station, based on the at least one attribute of the reference base station, the first locally unique attribute and the second locally unique attribute of the local base station; and
        determine the location of the mobile station based at least in part on the distance metric;
    wherein the at least one attribute of the reference base station includes a first globally unique attribute, the identity of the reference base station known to the mobile station based on the first globally unique attribute of the reference base station, and a third locally unique attribute and a fourth locally unique attribute each of the reference base station, and wherein the distance metric is computed based on the first locally unique attribute and the second locally unique attribute of the local base station, and the third locally unique attribute and the fourth locally unique attribute of the reference base station.

10. The mobile station of claim 9, wherein:
    the first globally unique attribute comprises a Cell ID of the reference base station.

11. The mobile station of claim 9, wherein:
    the first locally unique attribute comprises a midamble index of the local base station, the second locally unique attribute comprises a frequency parameter of the local base station, the third locally unique attribute comprises a midamble index of the reference base station, and the fourth locally unique attribute comprises a frequency parameter of the reference base station.

12. The mobile station of claim 9, wherein the distance metric is computed from the mobile station to the reference base station in response to a determination that a second globally unique attribute of a local base station is not available.

13. The mobile station of claim 9, wherein the processor is further configured to:
   determine that the third locally unique attribute and the fourth locally unique attribute of the local base station conveys conflicting information; and
   the receiver is further configured to:
   acquire the second globally unique attribute of the local base station in response to the determination of the conflicting information.

14. The mobile station of claim 9, wherein the processor is further configured to:
   determine whether a distance between the local base station and the reference base station exceeds a threshold distance from the reference base station; and
   the receiver is further configured to:
   acquire the second globally unique attribute of the local base station if it is determined that the distance between the local base station and the reference base station exceeds the threshold distance.

15. The mobile station of claim 9, wherein the distance metric comprises a number of hops away from the mobile station to the reference base station.

16. The mobile station of claim 9, wherein the mobile station operates in a TD-SCDMA or a UMTS-FDD messaging standards environment.

17. An apparatus comprising:
   means for acquiring at least one attribute of a reference base station such that the identity of the reference base station is known to a mobile station;
   means for acquiring a first locally unique attribute of a local base station and a second locally unique attribute of a local base station;
   means for computing a distance metric from the mobile station to the reference base station, based on the at least one attribute of the reference base station, the first locally unique attribute and the second locally unique attribute of the local base station; and
   means for determining the location of the mobile station based at least in part on the distance metric;
   wherein the at least one attribute of the reference base station includes a first globally unique attribute, the identity of the reference base station known to the mobile station based on the first globally unique attribute of the reference base station, and a third locally unique attribute and a fourth locally unique attribute each of the reference base station, and wherein computing the distance metric is based on the first locally unique attribute and the second locally unique attribute of the local base station, and the third locally unique attribute and the fourth locally unique attribute of the reference base station.

18. The apparatus of claim 17, wherein:
   the first globally unique attribute comprises a Cell ID of the reference base station.

19. The apparatus of claim 17, wherein:
   the first locally unique attribute comprises a midamble index of the local base station, the second locally unique attribute comprises a frequency parameter of the local base station, the third locally unique attribute comprises a midamble index of the reference base station, and the fourth locally unique attribute comprises a frequency parameter of the reference base station.

20. The apparatus of claim 17, wherein computing the distance metric from the mobile station to the reference base station is performed in response to a determination that a second globally unique attribute of a local base station is not available.

21. The apparatus of claim 17, further comprising:
   means for determining that the third locally unique attribute and the fourth locally unique attribute of the local base station conveys conflicting information; and
   means for acquiring the second globally unique attribute of the local base station in response to determining the conflicting information.

22. The apparatus of claim 17, further comprising:
   means for determining whether a distance between the local base station and the reference base station exceeds a threshold distance from the reference base station; and
   means for acquiring the second globally unique attribute of the local base station if it is determined that the distance between the local base station and the reference base station exceeds the threshold distance.

23. The apparatus of claim 17, wherein the distance metric comprises a number of hops away from the mobile station to the reference base station.

24. The apparatus of claim 17, wherein the mobile station operates in a TD-SCDMA or a UMTS-FDD messaging standards environment.

25. A computer program product residing on a non-transitory processor-readable medium and comprising processor-readable instructions configured to cause a processor to:
   acquire at least one attribute of a reference base station such that the identity of the reference base station is known to a mobile station;
   acquire a first locally unique attribute of a local base station and a second locally unique attribute of a local base station;
   compute a distance metric from the mobile station to the reference base station, based on the at least one attribute of the reference base station, the first locally unique attribute and the second locally unique attribute of the local base station; and
   determine the location of the mobile station based at least in part on the distance metric;
   wherein the at least one attribute of the reference base station includes a first globally unique attribute, the identity of the reference base station known to the mobile station based on the first globally unique attribute of the reference base station, and a third locally unique attribute and a fourth locally unique attribute each of the reference base station, and wherein computing the distance metric is based on the first locally unique attribute and the second locally unique attribute of the local base station, and the third locally unique attribute and the fourth locally unique attribute of the reference base station.

26. The computer program product of claim 25, wherein:
   the first globally unique attribute comprises a Cell ID of the reference base station.

27. The computer program product of claim 25, wherein:
   the first locally unique attribute comprises a midamble index of the local base station, the second locally unique attribute comprises a frequency parameter of the local base station, the third locally unique attribute comprises a midamble index of the reference base station, and the fourth locally unique attribute comprises a frequency parameter of the reference base station.

28. The computer program product of claim 25, wherein the distance metric computed from the mobile station to the reference base station is performed in response to a determination that a second globally unique attribute of a local base station is not available.

\* \* \* \* \*